Patented Aug. 25, 1953

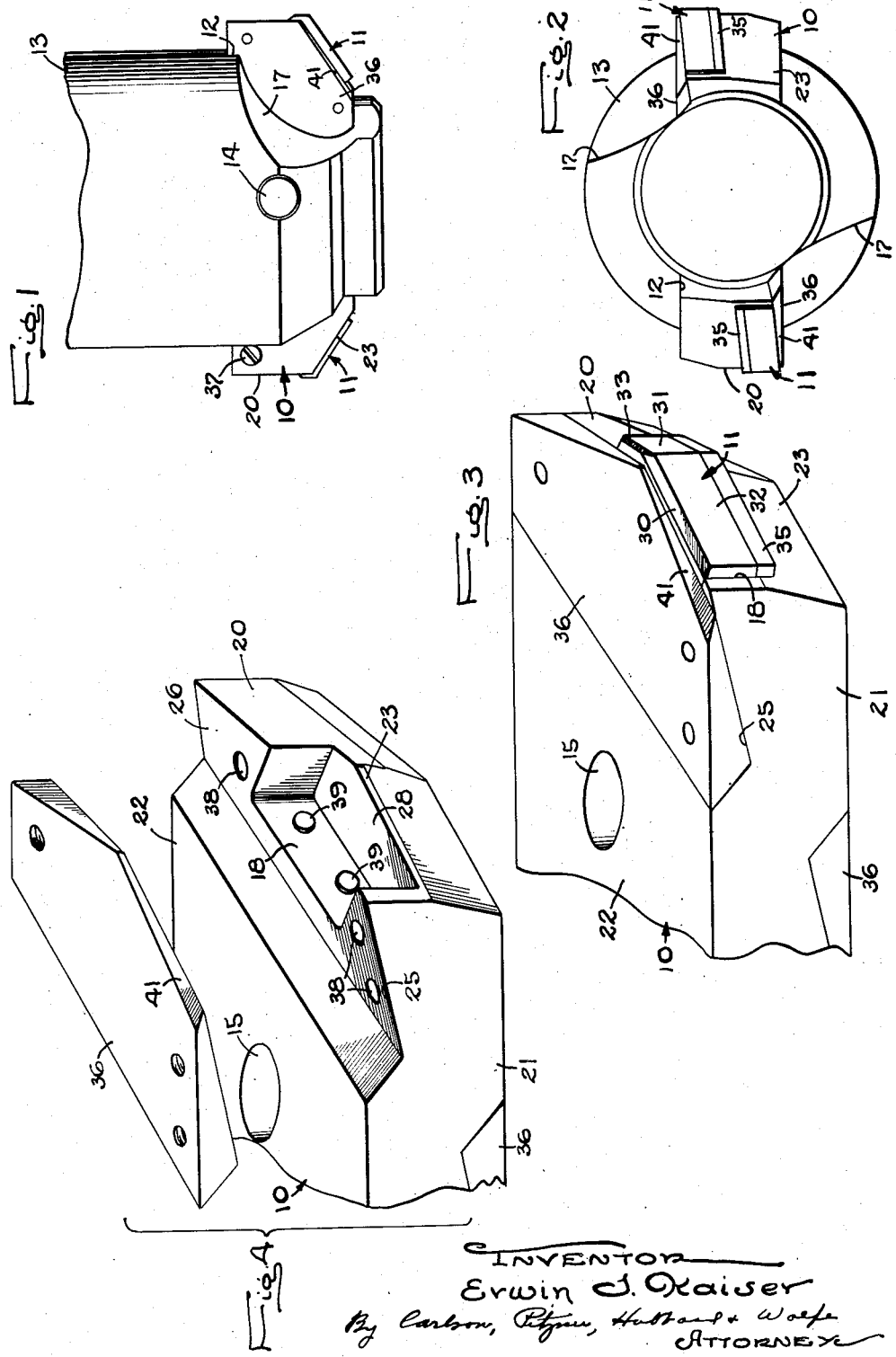

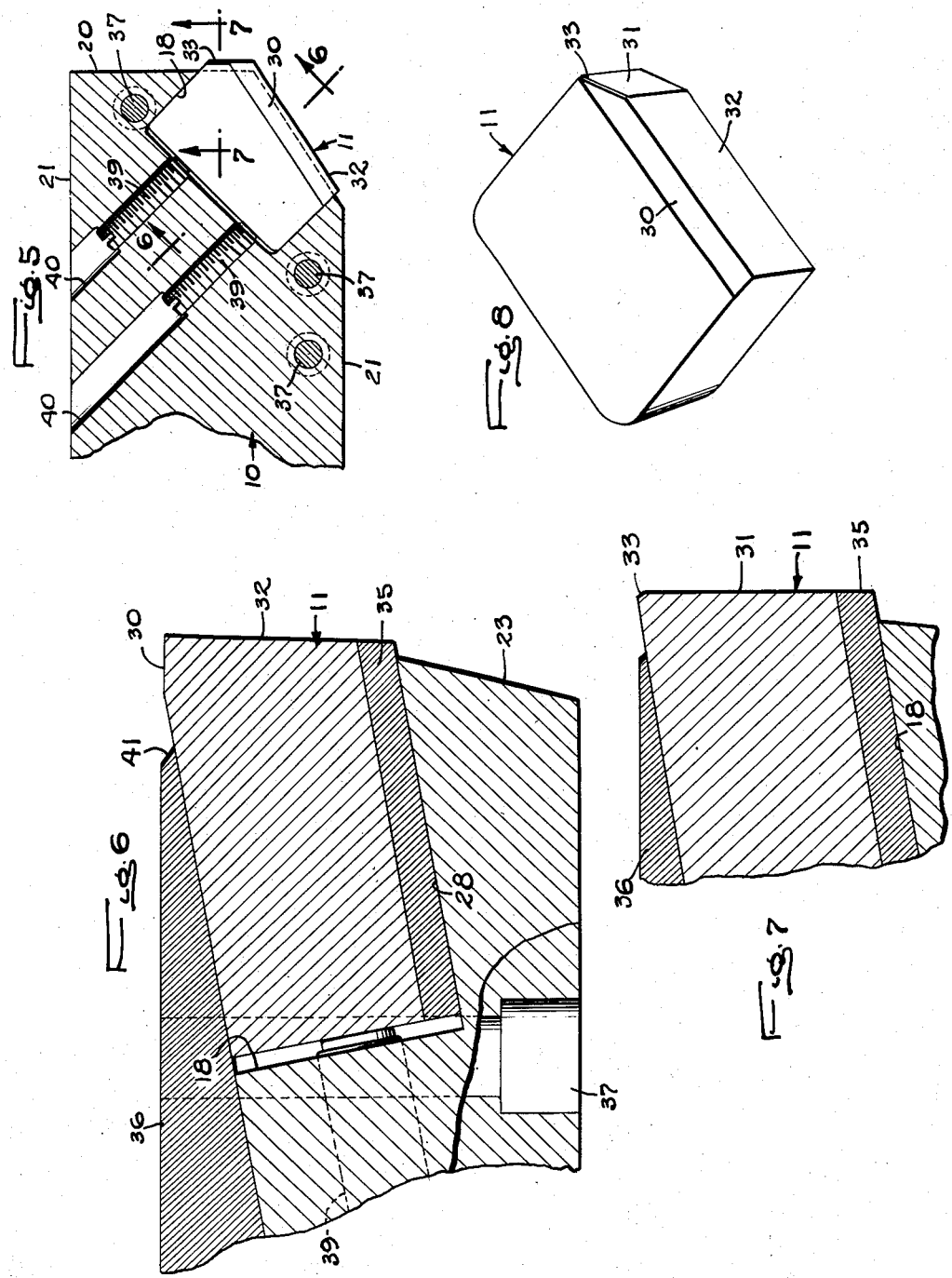

2,649,818

UNITED STATES PATENT OFFICE 2,649,818

METAL CUTTING TOOL

Erwin J. Kaiser, Fond du Lac, Wis., assignor to Giddings & Lewis Machine Tool Company, Fond du Lac, Wis., a corporation of Wisconsin Application May 10, 1950, Serial No. 161,058

8 Claims. (Cl. 77—58)

The invention relates generally to metal cutting tools and more particularly to a tool of the type having a relatively small cutter blade or tool bit and a separate supporting shank or holder for the same.

One object of the invention is to provide a metal cutting tool of the above general character embodying novel means for clamping the cutter blade in place in the holder and for breaking the material removed by the blade into relatively small chips.

Another object is to provide a block type cutting tool particularly suitable for use with a rotatable boring bar and having the cutter blade disposed with respect to the axis of the bar so that the cutting edge may be kept in proper cutting condition with a minimum of grinding and its position accurately maintained after each grinding.

Still another object is to provide a cutting tool in which the cutting blade is mounted on a holder for adjustment relative thereto and in which the positioning of the cutter blade is such that outward adjustment is effective to provide grinding stock on the top, end and front face of the blade.

Other objects and advantages of the invention will become apparent from the following detailed description of the preferred embodiment illustrated in the accompanying drawings, in which:

Figure 1 is a fragmentary top view of a boring bar equipped with a cutting tool embodying the features of the invention.

Fig. 2 is an end view of the boring bar and tool shown in Fig. 1.

Fig. 3 is an enlarged perspective view of one end of the cutting tool.

Fig. 4 is an exploded perspective view of the holder portion of the tool and the combined blade clamp and chip breaker.

Fig. 5 is a fragmentary sectional view of the tool taken in a plane intersecting the cutter blade slot and substantially parallel to the bottom wall of the slot.

Fig. 6 is a fragmentary sectional view taken in a plane substantially on the line 6—6 of Fig. 5.

Fig. 7 is a fragmentary sectional view taken in a plane substantially on the line 7—7 of Fig. 5.

Fig. 8 is a perspective view of the cutting blade of the tool.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

For purposes of illustration the improved metal cutting tool has been shown as comprising an elongated block or holder 10 of rectangular cross section arranged to carry cutter blades or tool bits 11 at opposite ends. This particular tool is adapted to be mounted in a diametrical slot 12 in a boring bar 13 with the cutter blades 11 projecting at opposite sides of the bar. A tapered pin 14 inserted through alined apertures in the bar and seating in a tapered socket 15 in the holder 10 maintains the tool accurately centered relative to the bar. The boring bar illustrated has its nose portion 16 reduced in diameter and opposite sides are notched as at 17 adjacent the ends of the slot 12 to provide clearance for the chips produced by the cutter.

The holder 10 preferably comprises an elongated rigid block of steel or other suitable material. Depending on the intended use of the tool, one or both ends of the block are shaped for rigidly supporting the cutter blades 11. As will be seen by reference to Fig. 8, the cutter blade 11 is generally rectangular and the block 10 is formed with a complemental slot 18 for the reception of the blade. When equipped with two of the blades 11 the positions of the blade retaining slots are reversed at opposite ends of the holder, as will be seen by reference to Fig. 2. Aside from this reversed position of the slot 18, the shaping of the holder is the same at each end and a description of one cutter mounting arrangement will therefore suffice.

In the exemplary tool, the block 10 is generally rectangular and somewhat wider than it is thick, thus presenting relatively narrow end and side faces 20 and 21 and substantially wider top and bottom faces 22.

Referring now to Figs. 3 and 4 of the drawings, it will be observed that one corner of the block 10 is beveled to present an angular face 23 between the narrow side face 21 and the end face 20. Extending back from this beveled corner is a generally wedge-shaped recess presenting a skewed shoulder or surface 26 sloping downwardly from the angular face 23 diagonally of the block.

In accordance with the invention, the cutter blade receiving slot 18 is formed in the sloping surface 26 preferably with its bottom wall 28 parallel to the surface. Moreover, the slot is positioned so that its axis is disposed at acute angles both to the axis of the block and to the top face 22 thereof. The slot thus intersects the angular face 23 and also the end face 20 of the block 10. Accordingly, when the cutter blade 11 is inserted in the slot its forward end portion projects so that it may be ground to provide three intersecting cutting faces including a top face 30, an end face 31 and a front face 32. A narrow land 33 may be ground on the end face 31 adjacent its upper edge. It will be understood that each face may be ground to present relief and rake angles suitable for the particular work to be done by the tool.

As indicated heretofore, the cutter blade 11 and the slot 18 are complementally shaped and the latter is dimensioned to receive the blade with a snug fit. A backup plate 35 is desirably inserted in the slot 18 beneath the blade to provide added support for the cutting edges of the blade and to protect the edges of the slot against excessive wear or damage in use. In practice the overall thickness of the blade and backup plate is slightly greater than the depth of the slot 18 to allow the blade and plate to be clamped in place. Such clamping is effected by a clamping plate 36 adapted to seat in the recess 25 and complementally shaped with respect thereto. This clamping plate which may be of high speed tool steel for maximum strength and wear, is rigidly secured to the block 10 in overlying relation to the slot 18 by means of screws 37 or the like. As herein shown, the screws 37 are inserted from the underside of the block through apertures 38 opening in the inclined bottom wall 26 of the recess 25. In the present instance three such screws are provided.

The recessing of the triangular clamping plate 36 into the block 10, as above described, insures tight clamping engagement between the plate and the cutter blade 11 in all adjusted positions of the latter. For convenience in adjusting the blade within the slot, a pair of adjusting screws 39 are threaded into apertures 40 extending diagonally through the block 10 from its rear face 21 to the rear wall of the slot 18. The screws, of course, are arranged parallel to the axis of the slot with their forward ends abutting the rear end of the cutter blade as shown in Fig. 5.

When the cutter blade requires sharpening the pressure of the clamping plate 36 is relieved temporarily and the adjusting screws 39 are screwed in to shift the blade outwardly. Due to the novel positioning of the slot 18 with its axis disposed at an acute angle to the axis of the block 10 and also at an acute angle to the top face 22 of the block, such adjustment of the cutter blade presents grinding stock on all cutting faces of the blade. More particularly, the cutter blade is projected in a path that diverges both laterally and upwardly at an acute angle from the axis of the block 10. Accordingly the original dimensions of the tool may be maintained with each resharpening and since all faces of the blade may be ground, its useful life is materially increased.

In accordance with another aspect of the invention the clamping plate 36 is shaped to serve as a chip breaker for the cutter blade 11, thus making it unnecessary to provide a chip breaker on the blade itself with the attendant grinding problems and reduced strength of the cutting edge. For this purpose the edge portion of the clamping plate which extends along the angular face 23 of the tool block is beveled as indicated at 41 to provide an inclined abutment spaced rearwardly from the main cutting edges of the blade. Material removed by the cutting edges of the blade is thus deflected from its normal path and broken into relatively small chips for convenient disposal.

It will be apparent from the foregoing that the invention provides a metal cutting tool of novel and advantageous construction. The novel manner of mounting the cutting blade in the tool block greatly facilitates sharpening of the blade and enables the original dimensions of the tool to be maintained after each resharpening. It also permits the clamping of the blade in place in a novel manner which insures rigid support at all times and in all positions of the blade and further enables the clamping plate to function as a chip breaker. The necessity of forming the blade with an integral chip breaker is thus avoided along with the difficult grinding problems presented thereby and the blade may be ground to provide maximum strength at all cutting edges.

I claim as my invention:

1. In a metal cutting tool, in combination, a generally rectangular block formed at one end with a diagonally disposed recess increasing progressively in depth from said one end of the block, said block having a cutter blade receiving slot opening in the end face of the block and in the bottom wall of said recess, a cutter blade adjustably mounted in said slot to present three angularly disposed cutting faces in spaced relation to the end of the tool, said slot having its axis disposed at acute angles both to the axis of said block and to the top face of the block so that outward movement of the cutter blade along said slot is effective to provide grinding stock on each of said three cutting faces, and a clamping plate removably secured in said recess for retaining said blade in adjusted positions.

2. A metal cutting tool comprising, in combination, an elongated generally rectangular block having relatively narrow side and end faces and substantially wider top and bottom faces, said body having one corner cut away to present an angular face between one end face and the adjacent side face and having a cutter blade receiving slot opening in said one end face and said angular face, a cutter blade adjustably received in said slot, said slot being disposed at acute angles both to the longitudinal axis of said block and to the top face of the block so that the outward movement of the cutter blade in said slot is effective to present grinding stock at the front, side and top edges of the blade.

3. In a metal cutting tool, in combination, a generally rectangular block formed at one end with a diagonally disposed recess increasing progressively in depth from said one end of the block, said block having a cutter blade receiving slot opening in the end face of the block and in the bottom wall of said recess, a cutter blade adjustably mounted in said slot, and presenting angularly related end and side cutting faces and a top cutting face, said slot having its axis inclined both horizontally and vertically with respect to the longitudinal axis of said block whereby outward movement of the cutter blade along said slot is effective to provide grinding stock on all three of said cutting faces, a clamping plate seated in said recess in overlying relation to said cutter blade, and means rigidly securing said clamping plate to said block.

4. In a metal cutting tool, in combination, a generally rectangular block formed at one end with a diagonally disposed recess increasing progressively in depth from said one end of the block, said block having a cutter blade receiving slot opening in the end face of the block and in the bottom wall of said recess, a cutter blade adjustably mounted in said slot, and presenting angularly related end and side cutting faces and a top cutting face, said slot having its axis inclined both horizontally and vertically with respect to the longitudinal axis of said block whereby outward movement of the cutter blade along said slot is effective to provide grinding stock on all three of said cutting faces, a generally triangular plate seated in said recess and overlying said cutter blade, said plate having one edge disposed in spaced relation to the cutting edges of the blade so as to break up the material removed by the blade into relatively small chips, and means removably securing said plate to said block to rigidly clamp said blade to the block.

5. A metal cutting tool comprising, in combination, an elongated block having a recess at one end increasing progressively in depth from said one end of the block so as to present its bottom wall skewed with respect to the axis of the block, said bottom wall being interrupted by a cutter blade receiving slot having its axis disposed at acute angles to the axis of the block and to the top wall of the block, a cutter blade mounted in said slot with a cutting face projecting beyond the end of the block, a clamping plate removably secured in said recess and overlying said cutter blade, said clamping plate having one edge disposed in spaced parallel relation to said cutting face of the blade, and said one edge being shaped for breaking up the material removed by said cutter blade into relatively small chips.

6. A metal cutting tool comprising, in combination, an elongated generally rectangular metal block having relatively narrow side and end faces and substantially wider top and bottom faces, said block having one corner beveled to present an angular face between one end face and the adjacent side face, said angular face being substantially perpendicular to the top and bottom faces of the block, the top face of said block being formed with a generally wedge-shaped recess presenting a flat surface terminating at said angular face and inclined downwardly at an acute angle therefrom, said block also having a generally rectangular cutter blade receiving slot opening in said inclined surface and in said end and angular faces, said slot being located so that its axis is disposed parallel to said inclined face and at acute angles to both the axes of the block and the top face thereof, a clamping member complementally shaped with respect to said recess and seated therein in overlying relation to said cutter blade receiving slot, and means removably securing said clamping member to said body.

7. A metal cutting tool comprising, in combination, an elongated generally rectangular block having a recess at one end increasing gradually in depth from the end of the block so as to present its bottom wall inclined at an acute angle to the top face of the block, said bottom wall being interrupted by a cutter blade receiving slot disposed with its axis substantially parallel to said bottom wall and disposed at an acute angle to the axis of the block, a cutter blade adjustably mounted in said slot, a clamping plate seated in said recess and extending over said slot, means securing said clamping plate to said body to rigidly clamp the cutter blade thereto in all adjusted positions of the latter, and adjusting screws threaded into said block and bearing against the inner end of said cutter blade for adjusting the position of the blade.

8. A metal cutting tool comprising, in combination, an elongated generally rectangular metal block having a rectangular slot opening at one end thereof for the reception of a complementally shaped cutter blade, said slot being disposed at an acute angle with respect to the longitudinal axis of said block and also at an acute angle with respect to the top face of the block, and a clamping member overlying said slot and removably secured to said block.

ERWIN J. KAISER.

References Cited in the file of this patent

UNITED STATES PATENTS

| Number | Name | Date |
|---|---|---|
| 1,341,565 | Krepps | May 25, 1920 |
| 1,387,343 | Betz | Aug. 9, 1921 |
| 2,378,094 | Nunes-Vaz | June 12, 1945 |

FOREIGN PATENTS

| Number | Country | Date |
|---|---|---|
| 18,182 | Great Britain | Dec. 31, 1915 |